United States Patent
Tiwari et al.

(10) Patent No.: US 8,407,032 B2
(45) Date of Patent: Mar. 26, 2013

(54) SYSTEM AND METHOD FOR NUMERICALLY EVALUATING THERMAL COMFORT INSIDE AN ENCLOSURE

(75) Inventors: Punit Tiwari, Bangalore (IN); Madhusudhana Reddy, Bangalore (IN); Andreas Wick, Hamburg (DE)

(73) Assignee: Airbus Engineering Centre India, Bangalore, Karnataka (IN)

( * ) Notice: Subject to any disclaimer, the term of this patent is extended or adjusted under 35 U.S.C. 154(b) by 476 days.

(21) Appl. No.: 12/797,613

(22) Filed: Jun. 10, 2010

(65) Prior Publication Data

US 2011/0015908 A1    Jan. 20, 2011

(30) Foreign Application Priority Data

Jul. 14, 2009 (IN) ............... 1665/CHE/2009

(51) Int. Cl.
*G06G 7/48* (2006.01)
(52) U.S. Cl. .......................................................... 703/6
(58) Field of Classification Search .............. 703/2, 6, 703/7; 706/45; 236/49.3, 44 C; 700/276; 702/50; 374/109
See application file for complete search history.

(56) References Cited

U.S. PATENT DOCUMENTS

| | | | | |
|---|---|---|---|---|
| 5,170,935 A | * | 12/1992 | Federspiel et al. | 236/44 C |
| 5,324,112 A | * | 6/1994 | Palazzetti et al. | 374/109 |
| 6,173,902 B1 | * | 1/2001 | Bauer et al. | 236/49.3 |
| 6,405,142 B1 | * | 6/2002 | Ogawa et al. | 702/50 |
| 6,477,518 B1 | * | 11/2002 | Li et al. | 706/45 |
| 7,206,728 B2 | * | 4/2007 | Ozeki et al. | 703/2 |
| 2004/0133406 A1 | * | 7/2004 | Ozeki et al. | 703/2 |
| 2006/0111816 A1 | * | 5/2006 | Spalink et al. | 700/276 |

FOREIGN PATENT DOCUMENTS

| | | |
|---|---|---|
| JP | 09014720 A | 1/1997 |
| JP | 2003207189 A | 7/2003 |

* cited by examiner

*Primary Examiner* — Kandasamy Thangavelu
(74) *Attorney, Agent, or Firm* — Prakash Nama; Global IP Services, PLLC

(57) ABSTRACT

A system and method for assessing thermal comfort in an enclosure is disclosed. In one embodiment, a method includes performing a numerical analysis on a calibration enclosure including a thermal manikin in a uniform thermal environment to obtain a surface heat transfer coefficient ($h_{cal}$) for each body part of the thermal manikin. The method also includes performing a numerical analysis on an enclosure including one or more thermal manikins in a non-uniform thermal environment to obtain a total heat flux ($q''_T$) for each body part of the one or more thermal manikins. The method further includes computing an equivalent temperature ($t_{eq}$) of each body part of the one or more thermal manikins using the obtained associated $h_{cal}$, the obtained associated $q''_T$, and an associated surface temperature of the body part. Furthermore, the method includes evaluating thermal comfort in the enclosure based on each computed $t_{eq}$.

25 Claims, 7 Drawing Sheets

SYSTEM AND METHOD FOR NUMERICALLY EVALUATING THERMAL COMFORT INSIDE AN ENCLOSURE

RELATED APPLICATIONS

Benefit is claimed under 35 U.S.C. 119(a)-(d) to India Non-Provisional application with Serial No.1665/CHE/2009 entitled "SYSTEM AND METHOD FOR NUMERICALLY EVALUATING THERMAL COMFORT INSIDE AN ENCLOSURE" by Airbus Engineering Centre India and Airbus Operations GmbH filed on 14 Jul., 2009, which is herein incorporated in its entirety by reference for all purposes.

FIELD OF TECHNOLOGY

The present invention relates generally to numerical simulations, and more particularly relates to numerical simulations to evaluate thermal comfort inside an enclosure.

BACKGROUND

Typically, a thermal environment inside an enclosure, such as a building, a vehicle or a cockpit of an aircraft, largely depends on parameters such as velocities, temperatures inside the enclosure, solar irradiation incident through a window glass and the like. For assessing thermal comfort inside an enclosure, it is necessary to evaluate the influence of the above-mentioned parameters on thermal sensation that an occupant actually feels inside the enclosure. Traditionally, thermal comfort assessment is performed through a predicted mean vote (PMV) approach as outlined in international organization for standardization (ISO) 7730 standards.

However, drawbacks with the PMV approach are that it is typically applicable under uniform and homogeneous conditions and it depends very much on empirical correlations which are based on various parameters (e.g., velocity, temperature, etc.). In summary, using the PMV approach in non-uniform thermal environmental conditions (that typically exist in aircrafts, vehicles and the like due to air velocity, differences between air and wall temperature and solar irradiation) may lead to incorrect prediction of the thermal comfort assessment.

Another conventional approach based on equivalent temperature ($t_{eq}$), as outlined in ISO 14505-2 standards, is an integrated measure of the effects of non-evaporative (dry) heat loss from a body of an occupant. The equivalent temperature ($t_{eq}$) refers to a temperature of an imaginary enclosure having a mean radiant temperature equal to an air temperature and still air in which an occupant has the same heat exchange rate by convection and radiation as in the actual conditions. As outlined in the ISO 14505-2 standards, $t_{eq}$ is typically calculated either using an empirical formula or through experiments. However, using the empirical formula may not be sensitive to changes in the physical parameters around the occupant inside the enclosure and may not yield actual $t_{eq}$ of the body of the occupant. Also, calculating $t_{eq}$ experimentally requires using thermal manikins (e.g., dummy dolls for reproducing thermal characteristics of occupants) and this may often be limited by cost, time and accurate representations of the actual conditions inside the enclosure.

SUMMARY

A system and method for numerically evaluating thermal comfort in an enclosure is disclosed. According to an aspect of the present invention, a method, implemented in a computing device, for numerically evaluating thermal comfort in an enclosure having a non-uniform thermal environment, includes performing a numerical analysis on a calibration enclosure including a thermal manikin in a uniform thermal environment based on a given set of boundary conditions for the uniform thermal environment using a numerical analysis tool in the computing device to obtain a surface heat transfer coefficient ($h_{cal}$) for each body part of the thermal manikin.

The method also includes performing a numerical analysis on the enclosure including one or more thermal manikins in the non-uniform thermal environment based on a set of boundary conditions for the non-uniform thermal environment using the numerical analysis tool to obtain a total heat flux ($q''_T$) for each body part of the one or more thermal manikins. Further, the method includes computing an equivalent temperature ($t_{eq}$) of each body part of the one or more thermal manikins in the non-uniform thermal environment based on the obtained $h_{cal}$, the obtained $q''_T$, and an associated surface temperature of the body part using a numerical thermal comfort analysis module in the computing device. Moreover, the method includes evaluating thermal comfort in the enclosure based on the computed $t_{eq}$ of each body part using the numerical thermal comfort analysis module.

According to another aspect of the present invention, an article includes a storage medium having instructions, that when executed by a computing device, result in execution of the method described above.

According to yet another aspect of present invention, a system for numerically evaluating thermal comfort in an enclosure having a non-uniform thermal environment includes multiple client devices, a computer network, and a remote server coupled to the multiple client devices via the computer network. The remote server includes a processor and memory. The memory includes a numerical analysis tool and a numerical thermal comfort analysis module. One of the client devices accesses the numerical analysis tool via the computer network and performs a numerical analysis on a calibration enclosure including a thermal manikin in a uniform thermal environment using a given set of boundary conditions for the uniform thermal environment to obtain a surface heat transfer coefficient ($h_{cal}$) for each body part of the thermal manikin.

The one of the client devices using the numerical analysis tool further performs a numerical analysis on the enclosure including one or more thermal manikins in the non-uniform thermal environment using a set of boundary conditions for the non-uniform thermal environment to obtain a total heat flux ($q''_T$) for each body part of the one or more thermal manikins. Then, the processor using the numerical thermal comfort analysis module computes an equivalent temperature ($t_{eq}$) of each body part of the one or more thermal manikins in the non-uniform thermal environment using the obtained $h_{cal}$, the obtained $q''_T$, and an associated surface temperature of the body part. Additionally, the processor using the numerical thermal comfort analysis module evaluates the thermal comfort in the enclosure based on each computed $t_{eq}$ and outputs results of the evaluation on a display device of the one of the client devices.

The methods, systems and apparatuses disclosed herein may be implemented in any means for achieving various aspects, and other features will be apparent from the accompanying drawings and from the detailed description that follow.

BRIEF DESCRIPTION OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION

A system and method for numerically evaluating thermal comfort inside an enclosure is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

In the document, the term "calibration enclosure" refers to an enclosure to be calibrated. The terms "uniform thermal environment" and "homogeneous environment" are used interchangeably throughout the document. Also, the terms "non-uniform thermal environment", "actual environment" and "non-homogeneous environment" are used interchangeably throughout the document. Further, the terms "computer network" and "network" are used interchangeably throughout the document. Furthermore, the terms "total dry heat loss" and "total heat flux" are used interchangeably throughout the document.

Figure 1:
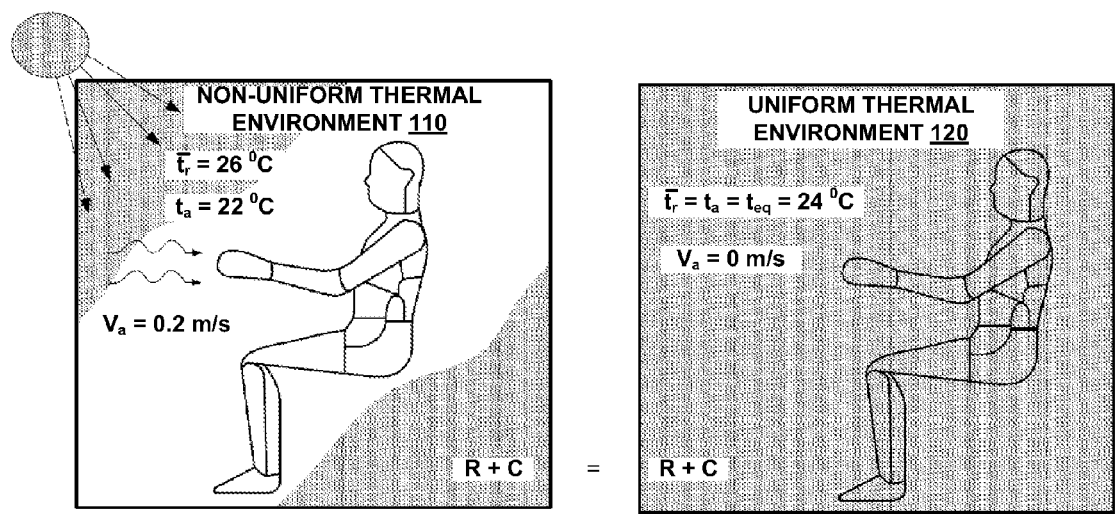
FIG. 1 illustrates a schematic representation of a comparison of a non-uniform thermal environment with a uniform thermal environment having same total dry heat loss using an equivalent temperature ($t_{eq}$) approach, according to an embodiment of the invention.

FIG. 1 illustrates a schematic representation 100 of a comparison of a non-uniform thermal environment 110 with a uniform thermal environment 120 having same total dry heat loss using an equivalent temperature ($t_{eq}$) approach, according to an embodiment of the invention. The non-uniform thermal environment 110 is an actual environment inside an enclosure which is influenced by parameters such as air velocities, temperatures inside the enclosure, and solar irradiation. Whereas, the uniform thermal environment 120 is an environment inside an imaginary enclosure in which air velocity is approximately equal to zero ($v_a \approx 0$ m/s), temperatures inside the enclosure are constant and which is not exposed to solar irradiation.

In the $t_{eq}$ approach, it is assumed that total dry heat loss (R+C) from an occupant is equal in both the non-homogeneous environment 110 and the homogeneous environment 120. The total dry heat loss is calculated according to the formula:

$$R+C = h_r \cdot (t_s - \overline{t_r}) + h_c \cdot (t_s - t_a),$$

where, R is the radiative heat loss, C is the convective heat loss, $t_a$ is the ambient air temperature (in °C./K), $\overline{t_r}$ is the mean radiant temperature of the uniform thermal environment and the non-uniform thermal environment (in °C./K), $t_s$ is the surface temperature of the occupant (e.g., 34° C. as per Human Thermoregulatory System), $h_c$ is the convective heat transfer coefficient (in W/m²° C.), and $h_r$ is the radiative heat transfer coefficient (in W/m²° C.).

Further, an equivalent temperature ($t_{eq}$) is defined as a temperature of the uniform thermal environment 120 with the mean radiant temperature ($\overline{t_r}$) equal to the ambient air temperature ($t_a$) and still air in which the occupant has the same heat exchange by convection and radiation as in the non-uniform thermal environment 110. Thus, by definition of $t_{eq}$, the equation for total dry heat loss in the uniform thermal environment 120 can be written as:

$$R+C = h_r \cdot (t_s - t_{eq}) + h_c \cdot (t_s - t_{eq}),$$

solving for $t_{eq}$, using the above-mentioned equations, yields:

$$t_{eq} = \frac{h_r \cdot \overline{t_r} + h_c \cdot t_a}{h_r + h_c} = t_s - \frac{R+C}{h_r + h_c}$$

Based on the above, the present invention provides a method to numerically evaluate thermal comfort in an enclosure having a non-homogeneous environment. Further, the method and system for evaluating the thermal comfort in the enclosure having the non-homogeneous environment is described in the description that follows.

Figure 2:
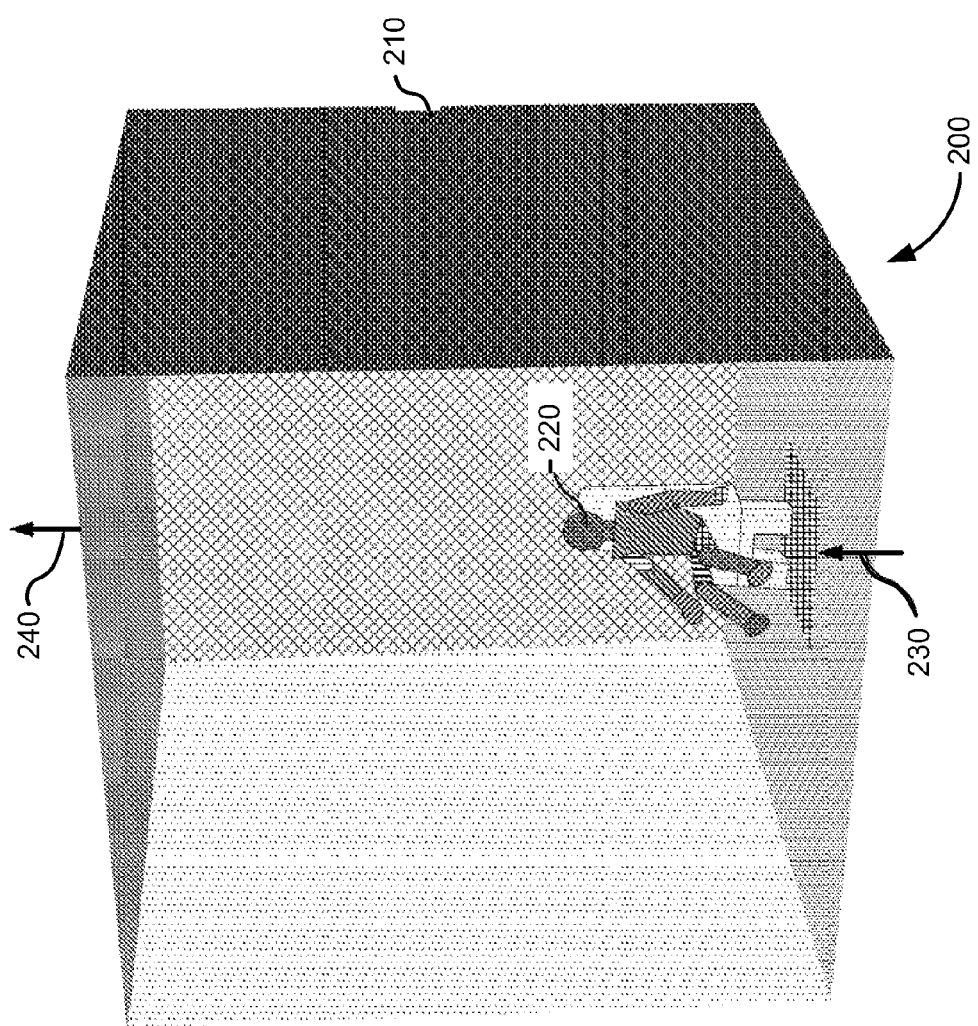
FIG. 2 illustrates a schematic diagram of a calibration enclosure including a thermal manikin, according to an embodiment of the invention.

FIG. 2 illustrates a schematic diagram 200 of a calibration enclosure 210 including a thermal manikin 220, according to an embodiment of the invention. Particularly, FIG. 2 shows the calibration enclosure 210 including the thermal manikin 220 with a uniform thermal environment (e.g., the uniform thermal environment 120 of FIG. 1). In one embodiment, a computational mesh for the calibration enclosure 210 including the thermal manikin 220 is formed by generating a plurality of cells, where each cell includes multiple nodes. For example, the computational mesh may be a 2D computational mesh or a 3D computational mesh. Further, the 2D/3D computational mesh may be structured, unstructured, or hybrid in type. It is appreciated that, the hybrid computational mesh is a combination of the structured computational mesh and the unstructured computational mesh.

The thermal manikin 220 inside the calibration chamber 210 is a dummy doll formed for reproducing thermal characteristics of an occupant. The thermal manikin 220 is segregated into various body parts substantially simultaneously to the formation of the calibration enclosure 210. In one embodiment, the segregation of the thermal manikin 220 into various body parts is performed based on a desired thermal comfort resolution. Exemplary body parts of the thermal manikin 220 may include lower left arm, lower right arm, upper left arm, upper right arm, left calf, right calf, left thigh, right thigh, chest, face, left foot, right foot, left hand, and right hand.

In some embodiments, a numerical analysis is performed on the computational mesh to obtain fluid flow and heat transfer parameters for each cell of the calibration enclosure 210. In these embodiments, the numerical analysis is performed based on a given set of boundary conditions for the uniform thermal environment. Exemplary parameters that define the given set of boundary conditions include inlet parameters, thermal manikin body surface parameter, enclosure wall parameters, thermal manikin clothing parameters and outlet parameters.

The inlet parameters may include inlet velocity (e.g., reference numeral 230), inlet flow temperature, and turbulence parameters (e.g., turbulent intensity, turbulent viscosity ratio, etc.). The thermal manikin body surface parameter may be a thermal manikin body surface temperature. The enclosure wall parameters may include wall temperature, and wall surface and material properties. The thermal manikin clothing parameters may include clothing thickness and cloth thermal conductivity. The outlet parameters may include outlet pressure (e.g., reference numeral 240), back flow total temperature, and back flow turbulence parameters (e.g., back flow turbulent intensity, back flow turbulent viscosity ratio, etc.).

Further, a surface heat transfer coefficient ($h_{cal}$) for each body part of the thermal manikin 220 is computed based on the obtained fluid flow and heat transfer parameters for each associated cell. In one embodiment, $h_{cal}$ for each body part is computed according to the formula:

$$h_{cal} = \frac{q''_{T,cal}}{t_s - t_a},$$

where, $q''_{T,cal}$ is the total dry heat loss for each body part of the thermal manikin 220 in the uniform thermal environment, $t_s$ is the surface temperature of the thermal manikin 220 in the uniform thermal environment, and $t_a$ is the ambient air temperature inside the calibration enclosure 210. This $h_{cal}$ for each body part of the thermal manikin 220 in the calibration enclosure 210 is then used to compute an equivalent temperature ($t_{eq}$) of each body part of one or more thermal manikins (e.g., the thermal manikins 320 and 330 of FIG. 3) in a non-uniform thermal environment (e.g., an environment in which thermal comfort is assessed).

Figure 3:
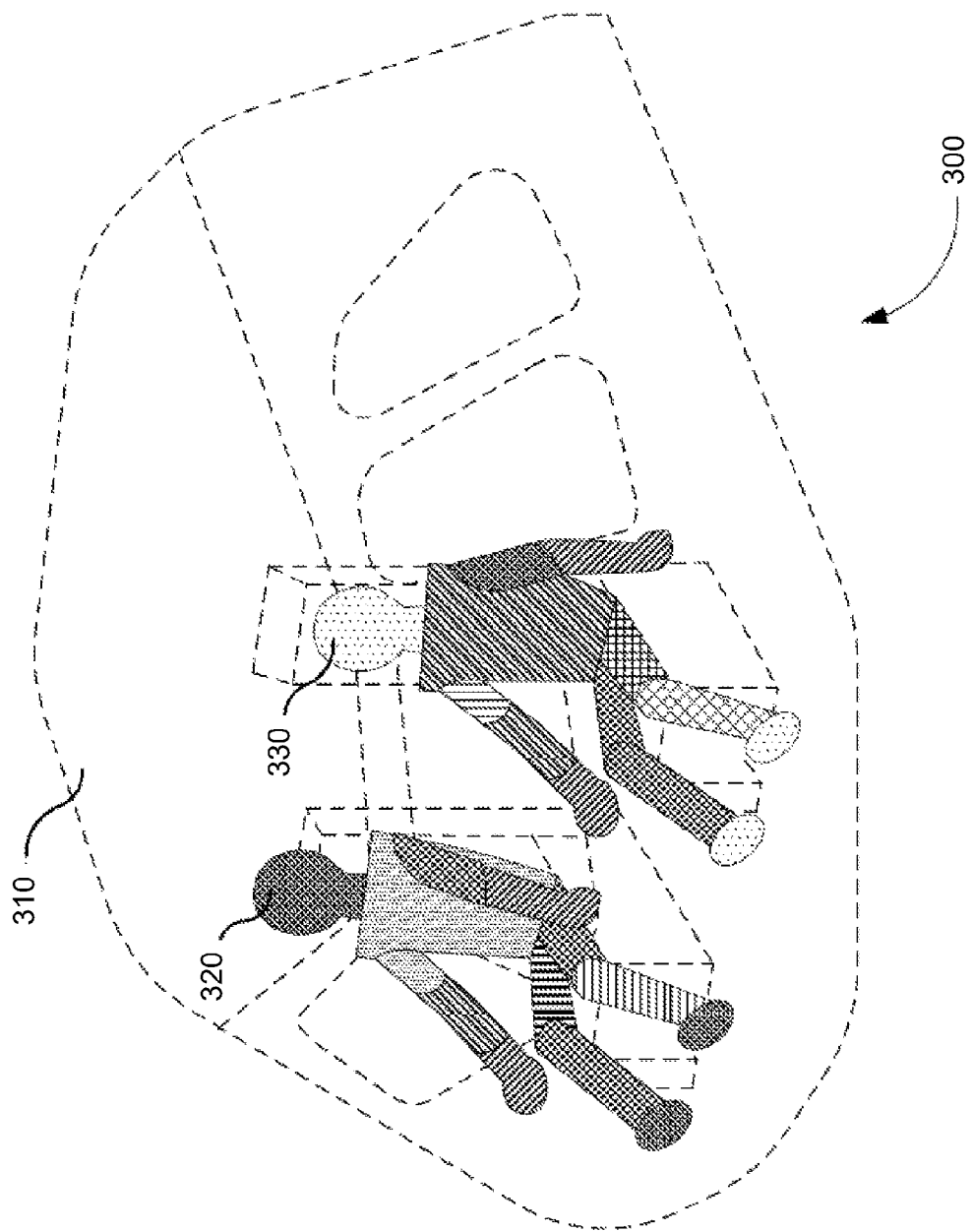
FIG. 3 illustrates a schematic diagram of an enclosure including thermal manikins, according to an embodiment of the invention.

FIG. 3 illustrates a schematic diagram 300 of an enclosure 310 including thermal manikins 320 and 330, according to an embodiment of the invention. Particularly, FIG. 3 shows the enclosure 310 including the thermal manikins 320 and 330 in a non-uniform thermal environment (e.g., the non-uniform thermal environment 110 of FIG. 1). For example, the enclosure 310 may be an actual enclosure, such as an aircraft, a vehicle (e.g., automotive, train, etc.), or a building, exposed to non-uniform/actual environmental conditions. In one embodiment, a computational mesh for the enclosure 310 including the thermal manikins 320 and 330 is formed by generating a plurality of cells, where each cell includes multiple nodes. For example, the computational mesh may be a 2D computational mesh or a 3D computational mesh. The 2D/3D computational mesh may be a structured, unstructured, or hybrid in type. It is appreciated that, the hybrid computational mesh is a combination of the structured computational mesh and the unstructured computational mesh.

Further, the thermal manikins 320 and 330 inside the enclosure 310 are segregated into various body parts substantially simultaneously to the formation of the enclosure 310. In one embodiment, the segregation of the thermal manikins 320 and 330 into various body parts is performed based on a desired thermal comfort resolution. Exemplary body parts of the thermal manikins 320 and 330 may include lower left arm, lower right arm, upper left arm, upper right arm, left calf, right calf, right thigh, left thigh, chest, face, left foot, right foot, left hand, and right hand. It is appreciated that the thermal manikins 320 and 330 are exemplary embodiments of the thermal manikin 220 of FIG. 2.

In some embodiments, a numerical analysis is performed on the computational mesh for obtaining fluid flow and heat transfer parameters for each cell of the enclosure 310. In these embodiments, the numerical analysis is performed based on a set of boundary conditions for the non-uniform thermal environment. Exemplary parameters that define the set of boundary conditions include inlet parameters, thermal manikin body surface parameter, enclosure wall parameters, semi transparent wall parameters (in case semi transparent walls are present in the enclosure 310), thermal manikin clothing parameters and outlet parameters.

The velocity inlet parameters may include inlet velocity, inlet flow temperature, and turbulence parameters (e.g., turbulent intensity, turbulent viscosity ratio, etc.). The thermal manikin body surface parameter may be a thermal manikin body surface temperature. The enclosure wall parameters may include a wall temperature, and wall surface and material properties. The semi transparent wall parameters may include semi transparent wall temperature, radiative properties of the wall, and direction and magnitude of solar flux incidence. The thermal manikin clothing parameters may include clothing thickness and cloth thermal conductivity. The outlet parameters may include outlet pressure, back flow total temperature, and back flow turbulence parameters (e.g., back flow turbulent intensity, back flow turbulent viscosity ratio, etc.).

Further, a total heat flux ($q''_T$) for each body part of the thermal manikins 320 and 330 is computed based on the obtained fluid flow and heat transfer parameters for each associated cell in the non-uniform thermal environment. In one embodiment, the total heat flux ($q''_T$) for each body part of the thermal manikins 320 and 330 is computed according to the formula:

$$q''_T = h_f(t_w - t_f) + q_{rad},$$

where, $h_f$ is the fluid side local heat transfer coefficient, $t_w$ is the wall surface temperature, $t_f$ is the local fluid temperature, and $q_{rad}$ is the radiative heat flux.

Then, $t_{eq}$ of each body part of the thermal manikins 320 and 330 in the non-uniform thermal environment is computed using the obtained associated $h_{cal}$ and the obtained associated $q''_T$. In one embodiment, $t_{eq}$ of each body part of the thermal manikin 320 and 330 is computed according to the formula:

$$t_{eq} = t_s - \frac{q''_T}{h_{cal}},$$

where, $t_s$ is the associated surface temperature of the body part.

Moreover, thermal comfort in the enclosure 310 having the non-uniform thermal environment is evaluated based on the each computed $t_{eq}$. In one exemplary implementation, the thermal comfort in the enclosure 310 is evaluated using the computed $t_{eq}$ for each body part and a thermal comfort diagram. The thermal comfort diagram may be based on international standards (ISO 14505-2) for the type of enclosure 310 (e.g., an aircraft, a building, a vehicle and the like). Moreover, assessment of the thermal comfort in the enclosure 310 using the thermal comfort diagram is discussed in greater detail in FIGS. 4A and 4B.

Figure 4A:
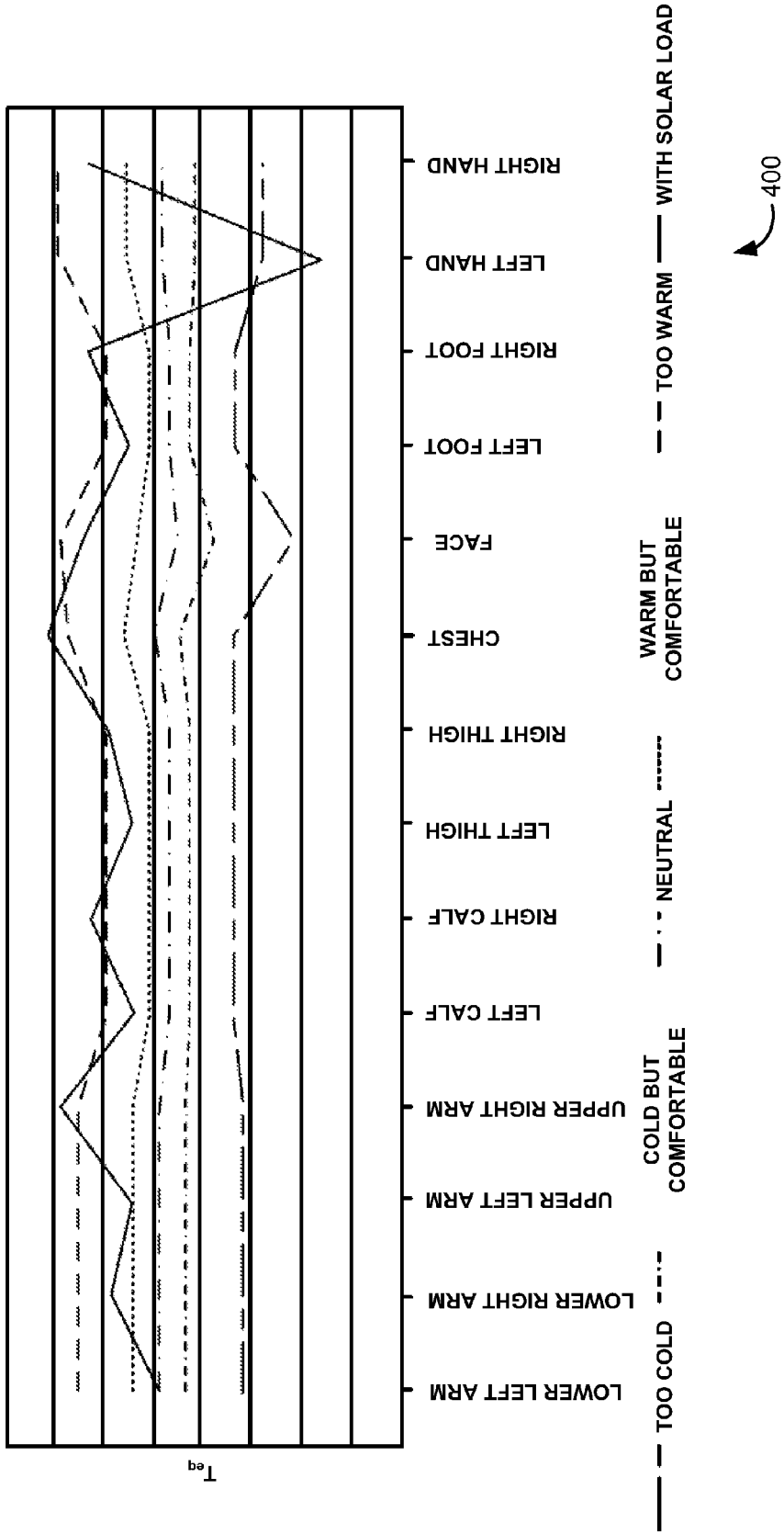
FIGS. 4A and 4B illustrate an exemplary thermal comfort assessment of an enclosure using thermal comfort diagrams with solar load and no solar load configurations for the enclosure.
Figure 4B:
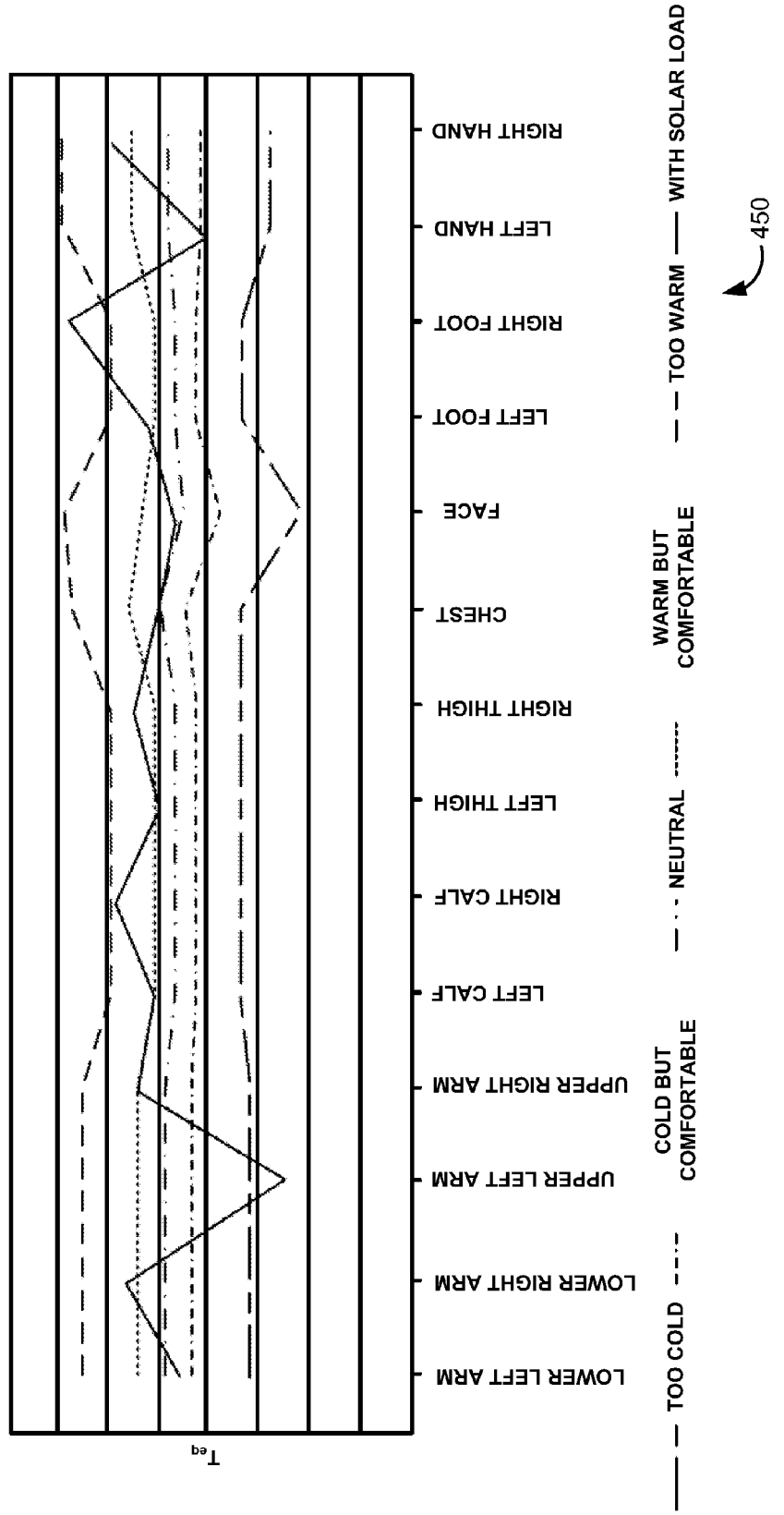

FIGS. 4A and 4B illustrate an exemplary thermal comfort assessment of the enclosure 310 using thermal comfort diagrams for solar load and no solar load configurations for the enclosure 310. It is appreciated that, the thermal comfort diagrams 400 and 450 are formed using $t_{eq}$ limits associated with comfort zone levels of each body part.

Particularly, FIG. 4A illustrates assessment of thermal comfort when the enclosure 310 is exposed to solar irradiation (e.g., solar load). As illustrated, the computed $t_{eq}$ of each body part is compared with $t_{eq}$ limits defined for the associated body part in the thermal comfort diagram 400. It can be seen in FIG. 4A that, the body parts, upper right arm, right calf, chest, right foot, and left hand lie outside the comfort zone. As illustrated, the $t_{eq}$ for the upper right arm, right calf, chest, and right foot falls above the too warm region while the $t_{eq}$ for the left hand lies below the too cold region.

FIG. 4B illustrates assessment of thermal comfort when the enclosure 310 is not exposed to solar irradiation (e.g., no solar load). As illustrated, the computed $t_{eq}$ of each body part is compared with $t_{eq}$ limits defined for the associated body part in the thermal comfort diagram 450. It can be seen in FIG. 4B that, the computed $t_{eq}$ of all the body parts of the thermal manikins 320 and 330 is within the comfort zone except the computed $t_{eq}$ of the upper left arm and the right foot. As illustrated, the $t_{eq}$ of the upper left arm is below the too cold region while the $t_{eq}$ of the right foot is above the too warm region. One skilled in the art will realize that the thermal comfort diagrams 400 and 450 provide a clear representation of a thermal state of an occupant inside an enclosure and can be efficiently used for assessing thermal comfort inside the enclosure 310.

Figure 5:
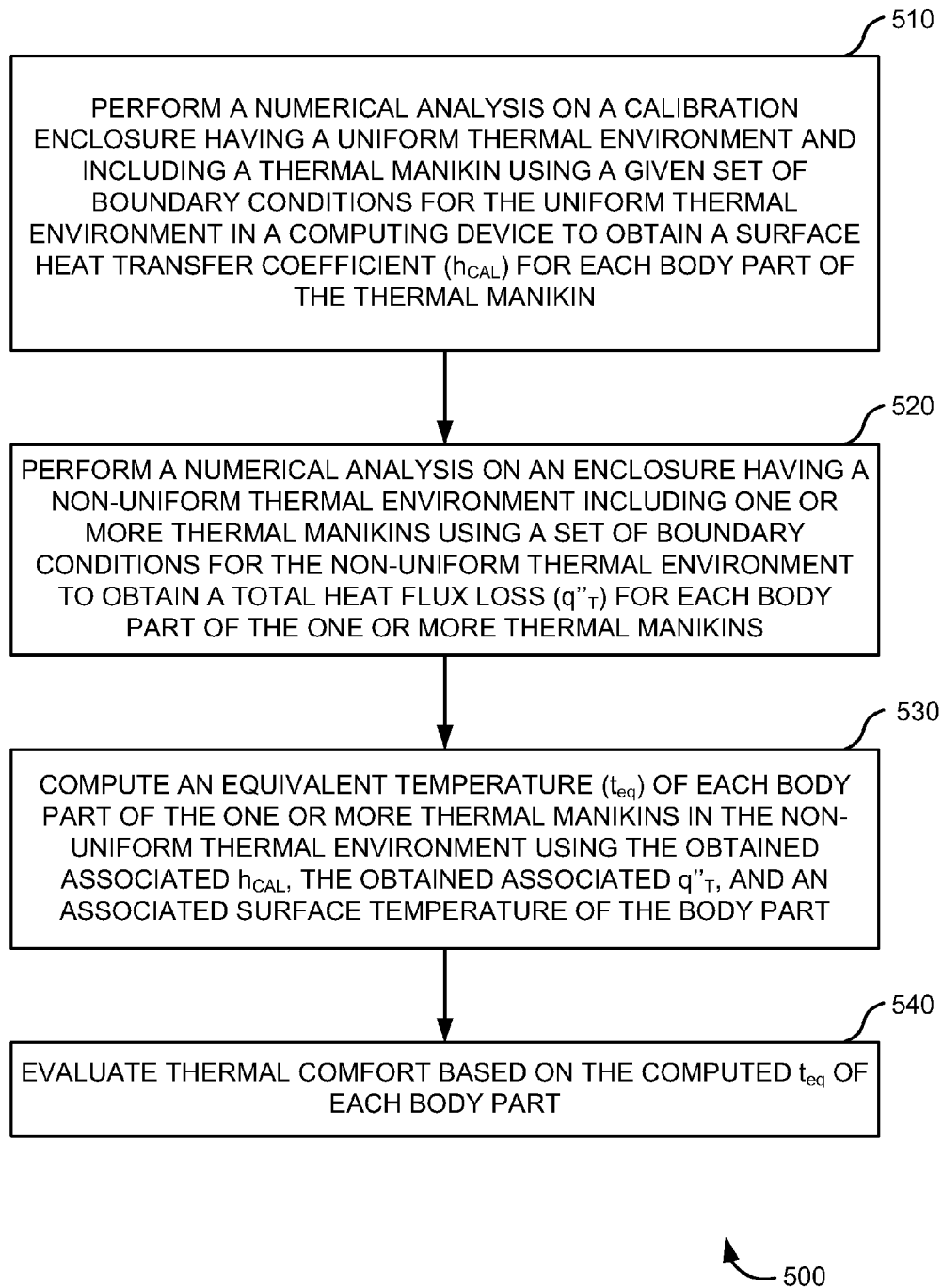
FIG. 5 illustrates a process flowchart of an exemplary method of numerically evaluating thermal comfort inside an enclosure having a non-uniform thermal environment, according to an embodiment of the invention.

FIG. 5 illustrates a process flowchart 500 of an exemplary method of numerically evaluating thermal comfort inside an enclosure having a non-uniform thermal environment, according to an embodiment of the invention. In operation 510, a numerical analysis is performed on a calibration enclosure including a thermal manikin in a uniform thermal environment to obtain a surface heat transfer coefficient ($h_{cal}$) for each body part of the thermal manikin. In one embodiment, the numerical analysis is performed based on a given set of boundary conditions for the uniform thermal environment using a numerical analysis tool.

In operation 520, a numerical analysis is performed on an actual enclosure (e.g., building, aircraft, vehicle, etc.) including one or more thermal manikins in the non-uniform thermal environment to obtain a total heat flux ($q''_T$) for each body part of the one or more thermal manikins. In one embodiment, the numerical analysis is performed based on a set of boundary conditions for the non-uniform thermal environment using the numerical analysis tool.

In operation 530, an equivalent temperature ($t_{eq}$) of each body part of the one or more thermal manikins in the non-uniform thermal environment is computed (e.g., using a numerical thermal comfort analysis module). In some embodiments, $t_{eq}$ is computed based on the obtained associated $h_{cal}$, the obtained associated $q''_T$, and an associated surface temperature of the body part. In operation 540, thermal comfort in the enclosure is evaluated (e.g., using the numerical thermal comfort analysis module) based on each computed $t_{eq}$.

Figure 6:
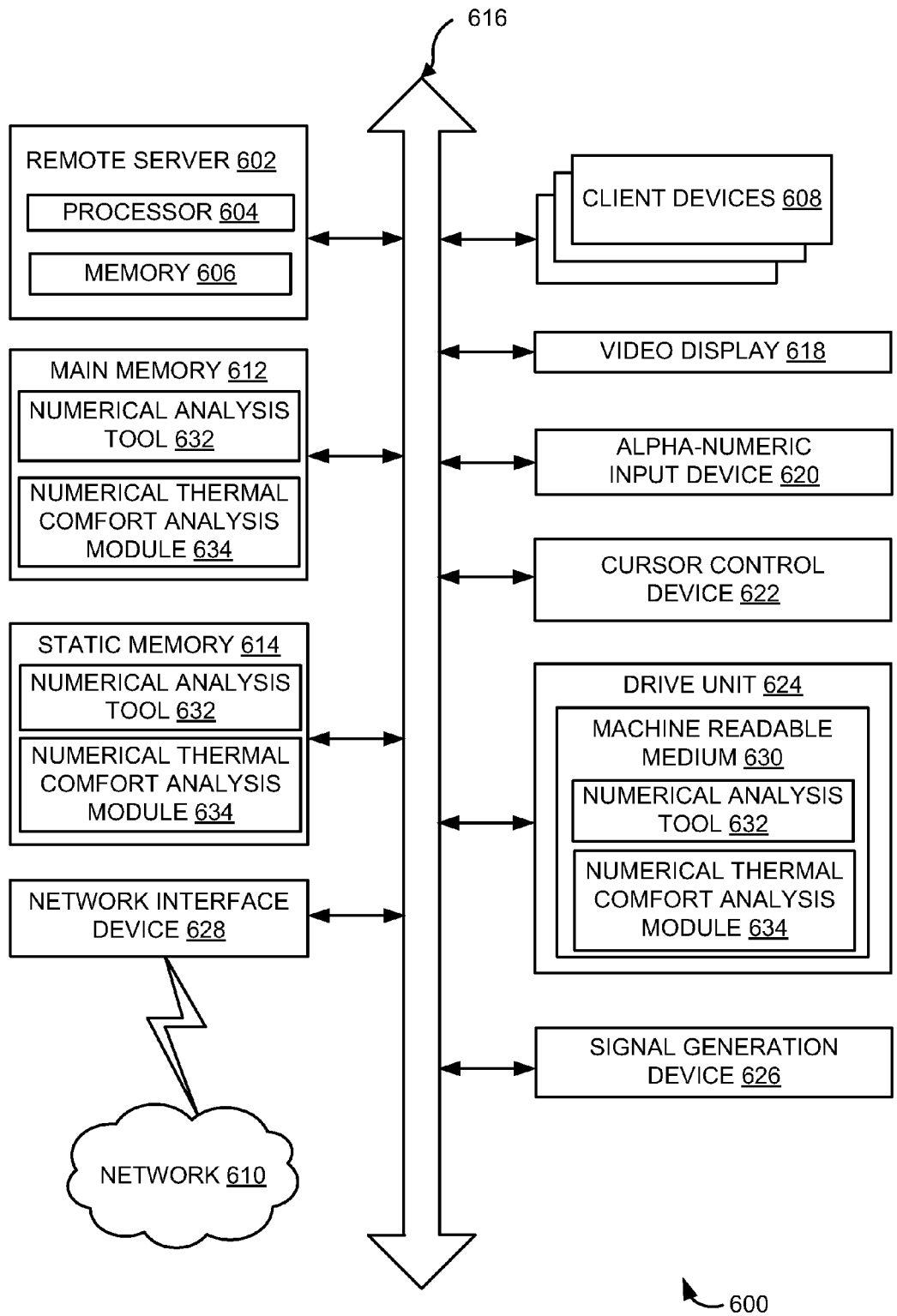
FIG. 6 is a diagrammatic system view of a data processing system in which any of the embodiments disclosed herein may be performed, according to an embodiment of the invention.

FIG. 6 is a diagrammatic system view 600 of a data processing system in which any of the embodiments disclosed herein may be performed, according to an embodiment of the invention. Particularly, the diagrammatic system view 600 of FIG. 6 illustrates a remote server 602 which includes a processor 604 and memory 606, client devices 608, and a computer network 610. The diagrammatic system view 600 also illustrates main memory 612, static memory 614, a bus 616, a video display 618, an alpha-numeric input device 620, a cursor control device 622, a drive unit 624, a signal generation device 626, a network interface device 628, a machine readable medium 630, a numerical analysis tool 632 (e.g., a mesh generator and finite volume solver), and a numerical thermal comfort analysis module 634.

The diagrammatic system view 600 may indicate a computing device and/or a data processing system in which one or more operations disclosed herein are performed. The remote server 602 may be a server coupled to the client devices 608 via the computer network 610. The remote server 602 may provide access to the numerical analysis tool 632 and the numerical thermal comfort analysis module 634 to the client devices 608 via the computer network 610. The processor 604 may be a microprocessor, a state machine, an application specific integrated circuit, a field programmable gate array, etc.

The memory 606 may be a non volatile memory that is temporarily configured to store a set of instructions associated with the numerical analysis tool 632 and the numerical thermal comfort analysis module 634. The client devices 608 may be multiple computer devices coupled to the remote server 602 via the computer network 610 for numerically evaluating thermal comfort in an enclosure (e.g., the enclosure 310 of FIG. 3) having a non-uniform thermal environment. The main memory 612 may be dynamic random access memory and/or primary memory. The static memory 614 may be a hard drive, a flash drive, and/or other memory associated with the data processing system.

The bus 616 may be an interconnection between various circuits and/or structures of the data processing system. The video display 618 may provide graphical representation of information on the data processing system. The alpha-numeric input device 620 may be a keypad, keyboard and/or any other input device of text. The cursor control device 622 may be a pointing device such as a mouse. The drive unit 624 may be a hard drive, a storage system, and/or other longer term storage subsystem.

The signal generation device 626 may be a basic input/output system (BIOS) and/or a functional operating system of the data processing system. The network interface device 628 may perform interface functions (e.g., code conversion, protocol conversion, and/or buffering) required for communications to and from the network 610 between multiple client devices 608 and the remote server 602. The machine readable medium 630 may provide instructions (e.g., associated with the numerical analysis tool 632 and the numerical thermal comfort analysis module 634) on which any of the methods disclosed herein may be performed. The numerical analysis tool 632 and the numerical thermal comfort analysis module 634 may provide source code and/or data code to the processor 604 to enable any one or more operations disclosed herein.

For example, a storage medium (e.g., the machine readable medium 630) has instructions, that when executed by a computing platform (e.g., the processor 604), result in execution of a method for numerically evaluating thermal comfort in an enclosure having a non-uniform thermal environment (e.g., the enclosure 310 of FIG. 3). The method includes performing a numerical analysis on a calibration enclosure (e.g., the enclosure 210 of FIG. 2) including a thermal manikin (e.g., the thermal manikin 220 of FIG. 2) in a uniform thermal environment using the numerical analysis tool 632 to obtain a surface heat transfer coefficient ($h_{cal}$) for each body part of the thermal manikin. In one example embodiment, the thermal manikin may include body parts segregated based on a desired thermal comfort resolution. The method also includes performing a numerical analysis on an actual enclosure including one or more thermal manikins (e.g., the thermal manikins 320 and 330 of FIG. 3) in the non-uniform thermal environment using the numerical analysis tool 632 to obtain a total heat flux ($q''_T$) for each body part of the one or more thermal manikins.

The method further includes computing an equivalent temperature ($t_{eq}$) of each body part of the one or more thermal manikins in the non-uniform thermal environment based on the obtained associated $h_{cal}$, the obtained associated $q''_T$, and an associated surface temperature of the body part using the numerical thermal comfort analysis module 634. Moreover, the method includes evaluating the thermal comfort in the enclosure based on each computed $t_{eq}$ using the numerical thermal comfort analysis module 634.

For performing the numerical analysis on the calibration enclosure, in one embodiment, the storage medium 630 may have instructions to generate a computational mesh (e.g., 2D or 3D) of the calibration enclosure including the thermal manikin in the uniform thermal environment using the numerical analysis tool 632. For example, the computational mesh may include a plurality of cells and each cell includes multiple nodes.

Further, the storage medium 630 may have instructions to perform a numerical analysis on the generated computational mesh to obtain fluid flow and heat transfer parameters for each cell based on a given set of boundary conditions for the uniform thermal environment using the numerical analysis tool 632. The storage medium 630 may also have instructions to compute $h_{cal}$ for each body part based on the obtained fluid flow and heat transfer parameters for each associated cell using the numerical analysis tool 632.

Further, for performing the numerical analysis on the enclosure, the storage medium 630 may have instructions to generate a computational mesh of the enclosure including the one or more thermal manikins in the non-uniform thermal environment using the numerical analysis tool 632. For example, the computational mesh may include a plurality of cells and each cell includes multiple nodes.

The storage medium 630 may also have instructions to perform a numerical analysis on the generated computational mesh to obtain fluid flow and heat transfer parameters for each cell based on a set of boundary conditions for the non-uniform thermal environment using the numerical analysis tool 632. Further, the storage medium 630 may have instructions to compute $q''_T$ for each body part of the one or more thermal manikins based on the obtained fluid flow and heat transfer parameters for each associated cell in the non-uniform thermal environment using the numerical analysis tool 632.

In accordance with the above described embodiments, one of the client devices 608 accesses the numerical analysis tool 632 via the computer network 610. Further, the one of the client devices 608 performs the numerical analysis on the calibration enclosure including the thermal manikin in the uniform thermal environment to obtain $h_{cal}$ for each body part of the thermal manikin using the numerical analysis tool 632. Then, the one of the client devices 608 performs the numerical analysis on an actual enclosure including one or more thermal manikins in the non-uniform thermal environment to obtain $q''_T$ for each body part of the one or more thermal manikins using the numerical analysis tool 632.

The processor 604 then computes $t_{eq}$ of each body part of the one or more thermal manikins using the obtained associated $h_{cal}$, the obtained associated $q''_T$, and an associated surface temperature of the body part using the numerical thermal comfort analysis module 634. Based on each computed $t_{eq}$, the processor 604 evaluates thermal comfort in the actual enclosure using the numerical thermal comfort analysis module 634. The processor 604 then displays results of evaluation of thermal comfort on a display device (e.g., the video display 618) of the one of the client devices 608.

In the one exemplary implementation, thermal comfort assessment in a cockpit of an aircraft having a non-uniform thermal environment is performed using the above-described systems and methods. For numerically evaluating thermal comfort inside the cockpit of the aircraft, the one of the client devices 608 generates a computational mesh of a calibration enclosure (e.g., the calibration enclosure 210 of FIG. 2) including a thermal manikin in a uniform thermal environment using the numerical analysis tool 632. Then, the one of the client devices 608 performs a numerical analysis on the generated computational mesh using the numerical analysis tool 632 to obtain fluid flow and heat transfer parameters for each cell of the computational mesh. Based on the obtained fluid flow and heat transfer parameters, the processor 604 computes $h_{cal}$ for each body part of the thermal manikin.

Following this, the one of the client devices 608 generates a computational mesh of the cockpit of the aircraft having similar thermal manikins (e.g., pilots) using the numerical analysis tool 632. In one embodiment, the following is considered while generating the computational mesh:

Surface mesh is sufficiently refined in regions such as inlets, sharp, corners, pilots and the like.

Boundary layers are generated at all surfaces to capture correct $Y^+$ values (e.g., a non-dimensional wall distance for a wall-bounded flow).

Volume mesh is refined in inlet jet regions.

Then, the one of the client devices 608 performs a numerical analysis on the cockpit using the numerical analysis tool 632 to obtain fluid flow and heat transfer parameters for each cell of the cockpit. In one embodiment, the numerical analysis tool 632 performs the numerical analysis on the cockpit using a set of boundary conditions for the cockpit. Further, based on the obtained fluid flow and heat transfer parameters, the processor 604 computes $q''_T$ for each body part of the thermal manikins using the numerical analysis tool 632.

Subsequently, the processor 604 computes $t_{eq}$ of each body part of the thermal manikins based on the obtained associated $h_{cal}$, the obtained associated $q''_T$ and an associated surface temperature of the body part using the numerical thermal comfort analysis module 634. Then, the processor 604 evaluates thermal comfort in the cockpit based on each computed $t_{eq}$ using the numerical thermal comfort analysis module 634. The results of evaluation are then displayed to a user of the one the client devices 608.

In various embodiments, the above-described technique has been validated by building numerical solutions to evaluate thermal comfort in various types of enclosures under different environmental conditions. The above-described technique is appropriately sensitive to changes in the physical conditions. Further, the above-described technique is completely performed using numerical solutions to reduce dependency on experiments and the like. This helps speed-up development cycle and reduce cost without compromising on the accuracy of determining thermal comfort in an enclosure. Furthermore, the above-described technique evaluates thermal comfort by considering special variations along with the occupant's body to account for variations in the flow and thermal conditions on each body part.

Although, the above-mentioned embodiments are described with respect to a numerical analysis tool to generate a computational mesh and perform numerical analysis on an enclosure, one can envision that, the computational mesh can be generated separately using a mesh generation tool (e.g., Hypermesh®) and the numerical analysis is performed separately using any numerical analysis tool (e.g., Fluent®).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, implemented in a computing device, for numerically evaluating thermal comfort in an actual enclosure having a non-uniform thermal environment, comprising:
performing a numerical analysis on a calibration enclosure including a thermal manikin in a uniform thermal environment based on a given set of boundary conditions for the uniform thermal environment;
performing a numerical analysis on the actual enclosure including one or more thermal manikins in the non-uniform thermal environment based on a set of boundary conditions for the non-uniform thermal environment;
computing an equivalent temperature ($t_{eq}$) of each body part of the one or more thermal manikins in the non-uniform thermal environment based on the numerical analysis performed in the uniform thermal environment, non-uniform thermal environment, and surface temperature of each body part; and
evaluating the thermal comfort in the actual enclosure based on each computed $t_{eq}$ using a numerical thermal comfort analysis module, wherein parameters that define the set of boundary conditions for the uniform thermal environment and the non-uniform thermal environment are selected from the group consisting of inlet parameters, thermal manikin body surface parameter, enclosure wall parameters, semi transparent wall parameters, thermal manikin clothing parameters and outlet parameters.

2. The method of claim 1, wherein performing the numerical analysis on the calibration enclosure including the thermal manikin in the uniform thermal environment based on the given set of boundary conditions, comprises:
generating a computational mesh of the calibration enclosure including the thermal manikin in the uniform thermal environment using a numerical analysis tool in the computing device and wherein the computational mesh includes a plurality of cells and each cell includes multiple nodes, wherein the thermal manikin includes body parts segregated based on a desired thermal comfort resolution;
performing a numerical analysis on the generated computational mesh to obtain fluid flow and heat transfer parameters for each cell based on the given boundary conditions for the uniform thermal environment using the numerical analysis tool; and
computing a surface heat transfer coefficient ($h_{cal}$) for each body part based on the obtained fluid flow and heat transfer parameters for each cell using the numerical analysis tool.

3. The method of claim 2, wherein performing the numerical analysis on the actual enclosure including the one or more thermal manikins in the non-uniform thermal environment based on the set of boundary conditions for the non-uniform thermal environment, comprises:
generating a computational mesh of the actual enclosure including the one or more thermal manikins in the non-uniform thermal environment using the numerical analysis tool and wherein the computational mesh includes a plurality of cells and each cell includes multiple nodes;
performing a numerical analysis on the generated computational mesh to obtain fluid flow and heat transfer parameters for each cell based on the set of boundary conditions for the non-uniform thermal environment using the numerical analysis tool; and
computing a total heat flux ($q''_T$) for each body part of the one or more thermal manikins based on the obtained fluid flow and heat transfer parameters for each cell in the non-uniform thermal environment using the numerical analysis tool.

4. The method of claim 3, wherein computing the equivalent temperature ($t_{eq}$) of each body part of the one or more thermal manikins in the non-uniform thermal environment comprises:
computing the equivalent temperature ($t_{eq}$) of each body part of the one or more thermal manikins in the non-uniform thermal environment based on the computed $h_{cal}$, the computed $q''_T$, and an associated surface temperature of the body part using the numerical thermal comfort analysis module in the computing device.

5. The method of claim 4, wherein the computational mesh is selected from the group consisting of 2D computational mesh and 3D computational mesh.

6. The method of claim 4, wherein the computational mesh is selected from the group consisting of structured, unstructured, and hybrid.

7. The method of claim 1, wherein the actual enclosure is selected from the group consisting of a building, a vehicle, and an aircraft.

8. The method of claim 1, wherein the inlet parameters are selected from the group consisting of inlet velocity, inlet flow temperature, and turbulence parameters.

9. The method of claim 1, wherein the outlet parameters are selected from the group consisting of outlet pressure, back flow total temperature, and back flow turbulence parameters.

10. The method of claim 1, wherein the enclosure wall parameters comprises a wall temperature, and wall surface and material properties.

11. The method of claim 1, wherein the semi transparent wall parameters are selected from the group consisting of semi transparent wall temperature, radiative properties of wall, and direction and magnitude of solar flux incidence.

12. The method of claim 1, wherein the thermal manikin body surface parameter is a thermal manikin body surface temperature.

13. The method of claim 1, wherein the thermal manikin clothing parameters are selected from the group consisting of clothing thickness and cloth thermal conductivity.

14. A system for numerically evaluating thermal comfort in an actual enclosure having a non-uniform thermal environment, comprising:
multiple client devices;
a computer network; and
a remote server coupled to the multiple client devices via the computer network, wherein the remote server comprises:
a processor; and
memory, wherein the memory includes a numerical analysis tool and a numerical thermal comfort analysis module, wherein one of the client devices accesses the numerical analysis tool via the computer network and performs a numerical analysis on a calibration enclosure including a thermal manikin in a uniform thermal environment using a given set of boundary conditions for the uniform thermal environment to obtain a surface heat transfer coefficient ($h_{cal}$) for each body part of the thermal manikin, wherein the one of the client devices using the numerical analysis tool further performs a numerical analysis on the actual enclosure including one or more thermal manikins in the non-uniform thermal environment using a set of boundary conditions for the non-uniform thermal environment to obtain a total heat flux ($q''_T$) for each body part of the one or more thermal manikins, wherein the processor using the numerical thermal comfort analysis module computes an equivalent temperature ($t_{eq}$) of each body part of the one or more thermal manikins in the non-uniform thermal environment using the obtained $h_{cal}$, the obtained $q''_T$, and an associated surface temperature of the body part, and wherein the processor using the numerical thermal comfort analysis module evaluates the thermal comfort in the actual enclosure based on each computed $t_{eq}$ and outputs results of the evaluation on a display device of the one of the client devices.

15. The system of claim 14, wherein performing the numerical analysis on the calibration enclosure including the thermal manikin in the uniform thermal environment based on the given set of boundary conditions, comprises:
  generating a computational mesh of the calibration enclosure including the thermal manikin in the uniform thermal environment using the numerical analysis tool and wherein the computational mesh includes a plurality of cells and each cell includes multiple nodes, wherein the thermal manikin includes body parts segregated based on a desired thermal comfort resolution;
  performing a numerical analysis on the generated computational mesh to obtain fluid flow and heat transfer parameters for each cell based on the given set of boundary conditions for the uniform thermal environment using the numerical analysis tool; and
  computing the surface heat transfer coefficient ($h_{cal}$) for each body part based on the obtained fluid flow and heat transfer parameters for each cell using the numerical analysis tool.

16. The system of claim 14, wherein performing the numerical analysis on the actual enclosure including the one or more thermal manikins in the non-uniform thermal environment based on the set of boundary conditions for the non-uniform thermal environment, comprises:
  generating a computational mesh of the actual enclosure including the one or more thermal manikins in the non-uniform thermal environment using the numerical analysis tool and wherein the computational mesh includes a plurality of cells and each cell includes multiple nodes;
  performing a numerical analysis on the generated computational mesh to obtain fluid flow and heat transfer parameters for each cell based on the set of boundary conditions for the non-uniform thermal environment using the numerical analysis tool; and
  computing the total heat flux ($q''_T$) for each body part of the one or more thermal manikins based on the obtained fluid flow and heat transfer parameters for each cell in the non-uniform thermal environment using the numerical analysis tool.

17. The system of claim 16, wherein the actual enclosure is selected from the group consisting of a building, a vehicle, and an aircraft.

18. An article, comprising:
  a storage medium having instructions, that when executed by a computing device, result in execution of a method for numerically evaluating thermal comfort in an actual enclosure having a non-uniform thermal environment, comprising:
    performing a numerical analysis on a calibration enclosure including a thermal manikin in a uniform thermal environment based on a given set of boundary conditions for the uniform thermal environment using a numerical analysis tool in the computing device to obtain a surface heat transfer coefficient ($h_{cal}$) for each body part of the thermal manikin;
    performing a numerical analysis on the actual enclosure including one or more thermal manikins in the non-uniform thermal environment based on a set of boundary conditions for the non-uniform thermal environment using the numerical analysis tool to obtain a total heat flux ($q''_T$) for each body part of the one or more thermal manikins;
    computing an equivalent temperature ($t_{eq}$) of each body part of the one or more thermal manikins in the non-uniform thermal environment based on the obtained $h_{cal}$, the obtained $q''_T$, and an associated surface temperature of the body part using a numerical thermal comfort analysis module in the computing device; and
    evaluating the thermal comfort in the actual enclosure based on each computed $t_{eq}$ using the numerical thermal comfort analysis module.

19. The article of claim 18, wherein performing the numerical analysis on the calibration enclosure including the thermal manikin in the uniform thermal environment based on the given set of boundary conditions, comprises:
  generating a computational mesh of the calibration enclosure including the thermal manikin in the uniform thermal environment using the numerical analysis tool and wherein the computational mesh includes a plurality of cells and each cell includes multiple nodes, wherein the thermal manikin includes body parts segregated based on a desired thermal comfort resolution;
  performing a numerical analysis on the generated computational mesh to obtain fluid flow and heat transfer parameters for each cell based on the given set of boundary conditions for the uniform thermal environment using the numerical analysis tool; and
  computing the surface heat transfer coefficient ($h_{cal}$) for each body part based on the obtained fluid flow and heat transfer parameters for each cell using the numerical analysis tool.

20. The article of claim 18, wherein performing the numerical analysis on the actual enclosure including the one or more thermal manikins in the non-uniform thermal environment based on the set of boundary conditions for the non-uniform thermal environment, comprises:
  generating a computational mesh of the actual enclosure including the one or more thermal manikins in the non-uniform thermal environment using the numerical analysis tool and wherein the computational mesh includes a plurality of cells and each cell includes multiple nodes;
  performing a numerical analysis on the generated computational mesh to obtain fluid flow and heat transfer parameters for each cell based on the set of boundary conditions for the non-uniform thermal environment using the numerical analysis tool; and computing the total heat flux ($q''_T$) for each body part of the one or more thermal manikins based on the obtained fluid flow and heat transfer parameters for each cell in the non-uniform thermal environment using the numerical analysis tool.

21. A method, implemented in a computing device, for numerically evaluating thermal comfort in an actual enclosure having a non-uniform thermal environment, comprising:

performing a numerical analysis on a calibration enclosure including a thermal manikin in a uniform thermal environment based on a given set of boundary conditions for the uniform thermal environment using a numerical analysis tool in the computing device to obtain a surface heat transfer coefficient ($h_{cal}$) for each body part of the thermal manikin;

performing a numerical analysis on the actual enclosure including one or more thermal manikins in the non-uniform thermal environment based on a set of boundary conditions for the non-uniform thermal environment using the numerical analysis tool to obtain a total heat flux ($q''_T$) for each body part of the one or more thermal manikins;

computing an equivalent temperature ($t_{eq}$) of each body part of the one or more thermal manikins in the non-uniform thermal environment based on the obtained $h_{cal}$, the obtained $q''_T$, and an associated surface temperature of the body part using a numerical thermal comfort analysis module in the computing device; and evaluating the thermal comfort in the actual enclosure by comparing each computed $t_{eq}$ with a thermal comfort diagram using the numerical thermal comfort analysis module, wherein the thermal comfort diagram is formed using $t_{eq}$ limits associated with comfort zone levels of each body part.

22. The method of claim 21, wherein performing the numerical analysis on the calibration enclosure including the thermal manikin in the uniform thermal environment based on the given set of boundary conditions, comprises:

generating a computational mesh of the calibration enclosure including the thermal manikin in the uniform thermal environment using the numerical analysis tool and wherein the computational mesh includes a plurality of cells and each cell includes multiple nodes, wherein the thermal manikin includes body parts segregated based on a desired thermal comfort resolution;

performing a numerical analysis on the generated computational mesh to obtain fluid flow and heat transfer parameters for each cell based on the given boundary conditions for the uniform thermal environment using the numerical analysis tool; and computing the surface heat transfer coefficient ($h_{cal}$) for each body part based on the obtained fluid flow and heat transfer parameters for each cell using the numerical analysis tool.

23. The method of claim 21, wherein performing the numerical analysis on the actual enclosure including the one or more thermal manikins in the non-uniform thermal environment based on the set of boundary conditions for the non-uniform thermal environment, comprises:

generating a computational mesh of the actual enclosure including the one or more thermal manikins in the non-uniform thermal environment using the numerical analysis tool and wherein the computational mesh includes a plurality of cells and each cell includes multiple nodes;

performing a numerical analysis on the generated computational mesh to obtain fluid flow and heat transfer parameters for each cell based on the set of boundary conditions for the non-uniform thermal environment using the numerical analysis tool; and manikins based on the obtained fluid flow and heat transfer parameters for each cell in computing the total heat flux ($q''_T$) for each body part of the one or more thermal the non-uniform thermal environment using the numerical analysis tool.

24. The method of claim 21, wherein the thermal comfort diagram is based on international standards for a type of the actual enclosure.

25. The method of claim 24, wherein the type of the actual enclosure is selected from the group consisting of a building, a vehicle, and an aircraft.

* * * * *